UNITED STATES PATENT OFFICE.

CHRISTIAN DENGEL, OF EAST NEW YORK, N. Y.

MEDICAL COMPOUND.

SPECIFICATION forming part of Letters Patent No. 229,874, dated July 13, 1880.

Application filed April 9, 1880. (Specimens.)

*To all whom it may concern:*

Be it known that I, CHRISTIAN DENGEL, a citizen of the United States, residing at East New York, in the county of Kings and State of New York, have invented a new and useful Composition of Matter to be used for Medicinal Purposes, of which the following is a specification.

My composition consists of the following ingredients, combined in the proportions stated: powdered mandrake-root, commonly known as "May-apple," one and one-half ounce; powdered gum-aloes, one and one-half ounce; powdered gum-myrrh, one and one-half ounce; powdered rhubarb, one and one-half ounce; pure spirits or alcohol, one quart. These ingredients are to be thoroughly mingled by agitation.

The above composition is very successful in curing headache, piles, asthma, biliousness, neuralgia, many diseases of the skin, and diseases of the blood.

The composition is to be taken in doses of a tea-spoonful or so twice a day, the size of the dose being increased with the aggravation of the disease. It acts as a mild cathartic, and also as a tonic. By its effect upon the liver it aids the action of that organ, and by its slightly bitter taste it acts as a stimulant in provoking an appetite. It is pleasant to the taste; but if it is desired a mild flavor may be added by the admixture of powdered cinnamon, or a substance having an equivalent effect.

Instead of the spirits or alcohol, whisky may be used; but I prefer the alcohol, as it has less taste of its own.

The proportions given above may be slightly varied without materially affecting the beneficial action of my composition.

I am aware that pills have been made of rhubarb and aloes, and also of myrrh and aloes; but I am not aware that all of the ingredients of my composition in the proportions stated, or substantially in those proportions, have been used together.

What I claim, and desire to secure by Letters Patent of the United States, is—

The herein-described composition of matter to be used for medicinal purposes, consisting of May-apple, gum-aloes, gum-myrrh, rhubarb, and spirits or alcohol, substantially in the proportions specified.

CHRISTIAN DENGEL.

Witnesses:
SAML. R. BETTS,
EDWARD J. BLAIR.